US 9,946,674 B2

(12) United States Patent
Mayer et al.

(10) Patent No.: US 9,946,674 B2
(45) Date of Patent: Apr. 17, 2018

(54) SCALABLE MULTI-CORE SYSTEM-ON-CHIP ARCHITECTURE ON MULTIPLE DICE FOR HIGH END MICROCONTROLLER

(71) Applicant: Infineon Technologies AG, Neubiberg (DE)

(72) Inventors: Albrecht Mayer, Deisenhofen (DE); Joerg Schepers, Rottach-Egern (DE); Frank Hellwig, Wunstorf (DE)

(73) Assignee: Infineon Technologies AG, Neubiberg (DE)

( * ) Notice: Subject to any disclaimer, the term of this patent is extended or adjusted under 35 U.S.C. 154(b) by 176 days.

(21) Appl. No.: 15/140,815

(22) Filed: Apr. 28, 2016

(65) Prior Publication Data

US 2017/0315944 A1    Nov. 2, 2017

(51) Int. Cl.
| G06F 12/06 | (2006.01) |
| G06F 13/364 | (2006.01) |
| G06F 13/24 | (2006.01) |
| G06F 13/40 | (2006.01) |
| G06F 13/42 | (2006.01) |
| G06F 15/78 | (2006.01) |

(52) U.S. Cl.
CPC ............ *G06F 13/364* (2013.01); *G06F 13/24* (2013.01); *G06F 13/404* (2013.01); *G06F 13/4282* (2013.01); *G06F 15/7807* (2013.01)

(58) Field of Classification Search
None
See application file for complete search history.

(56) References Cited

U.S. PATENT DOCUMENTS

| 7,353,362 | B2 * | 4/2008 | Georgiou ............ G06F 15/7832 710/306 |
| 7,636,816 | B2 * | 12/2009 | Pong ................... G06F 12/0223 711/147 |
| 8,893,267 | B1 * | 11/2014 | Sathe ...................... G06F 21/31 711/153 |
| 8,949,474 | B1 * | 2/2015 | Swarbrick ............... G06F 12/10 709/218 |
| 2007/0153572 | A1 | 7/2007 | Boeve |
| 2009/0057914 | A1 | 3/2009 | McDonald-Maier et al. |
| 2011/0018623 | A1 | 1/2011 | More et al. |
| 2011/0115000 | A1 | 5/2011 | Yang |

(Continued)

FOREIGN PATENT DOCUMENTS

WO    2011/107612 A1    9/2011

*Primary Examiner* — Cheng-Yuan Tseng
(74) *Attorney, Agent, or Firm* — Eschweiler & Potashnik, LLC

(57) ABSTRACT

A system for a multiple chip architecture that enables different system on-chip (SoC) systems with varying compatibilities to interact as one SoC via a transparent interface. The system address maps of the single SoCs are configured so that each provide a system address map of the two SoCs without overlap or address re-mapping when connected to one another via the transparent interface. The transparent interface enables components related to safety/security and interrupt communication of a first and second SoC within the multiple chip system to transparently communicate and interact. The transparent interface can enable sources of both SoCs to be flexibly mapped to interrupt services providers on the first/second SoC within the multiple chip system.

25 Claims, 6 Drawing Sheets

(56) References Cited

U.S. PATENT DOCUMENTS

| | | |
|---|---|---|
| 2011/0138093 A1 | 5/2011 | Jones et al. |
| 2011/0133825 A1 | 6/2011 | Jones et al. |
| 2011/0134705 A1 | 6/2011 | Jones et al. |
| 2011/0135046 A1 | 6/2011 | Jones et al. |
| 2011/0261603 A1 | 10/2011 | Jones et al. |
| 2011/0320669 A1 | 12/2011 | Scandurra et al. |
| 2012/0210093 A1 | 8/2012 | Urzi et al. |
| 2012/0210288 A1 | 8/2012 | Urzi et al. |
| 2013/0031330 A1 | 1/2013 | Jones et al. |
| 2013/0031347 A1 | 1/2013 | Jones et al. |
| 2014/0152340 A1 | 6/2014 | Cho et al. |
| 2014/0201406 A1 | 7/2014 | Balakrishnan et al. |
| 2015/0127865 A1 | 5/2015 | Sarta et al. |
| 2015/0179286 A1 | 6/2015 | Miller et al. |

* cited by examiner

SCALABLE MULTI-CORE SYSTEM-ON-CHIP ARCHITECTURE ON MULTIPLE DICE FOR HIGH END MICROCONTROLLER

FIELD

The present disclosure relates to microcontrollers and more specifically, to a scalable multi-core system-on-chip architecture on multiple dice for a high-end microcontroller of a microcontroller family.

BACKGROUND

Computer systems are increasingly being used in applications where they are entrusted with functions upon which human life can depend. Such safety relevant computer systems can be implemented into medical devices, anti-lock braking systems in automobiles, shut-down systems at nuclear power plants, etc. Safety relevant computer systems may be coupled with sensors configured to sense operations of the systems, and to react to possible dangerous situations with a speed and dependability that is unmatched by human capabilities. Accordingly, in safety relevant computer systems, hardware based failure is unacceptable and the timely detection of any such failure is important.

Today multi SoC systems are based on multiple independent SoCs, mounted stacked and/or mounted on a substrate and connected via serial or parallel interfaces to a complex product. Each SoC represents its own/separate SoC architecture with its own system address map that provides access the system resources. The interface for the inter die communication (data transfers) do not provide a transparent access from one SoC into the other SoC, which means it requires address re-mapping.

DETAILED DESCRIPTION

Figure 1:
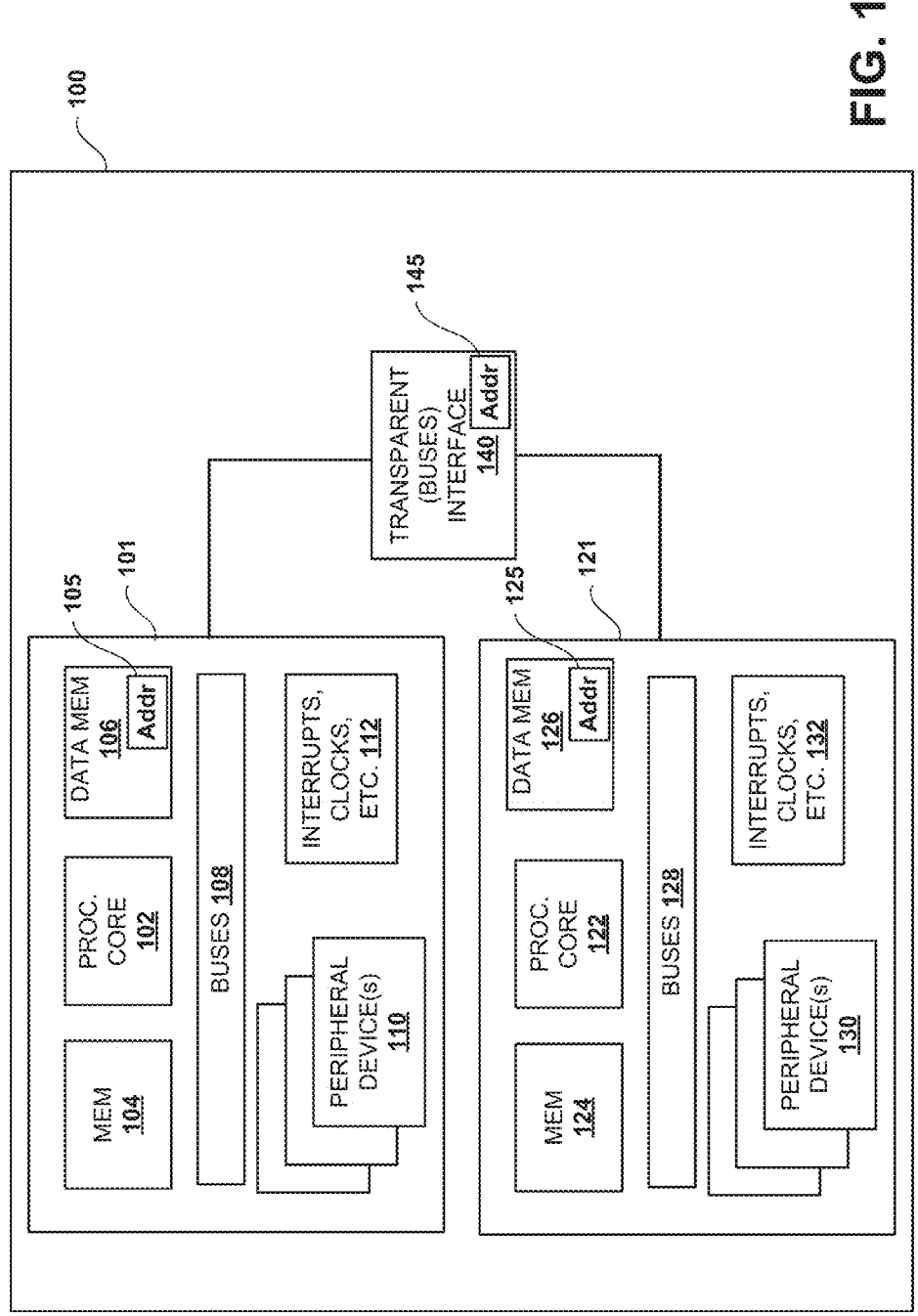
FIG. 1 is a block diagram illustrating an SoC architecture on multiple dice with a transparent interconnect in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "interconnect", and the like are intended to refer to a computer-related entity, hardware, software (e.g., in execution), and/or firmware. For example, these terms such as a "component" can be a circuit, a processor, a process running on a processor, a controller, an object, an executable, a program, a storage device, a computer, a tablet PC and/or a mobile device (e.g., a phone or the like) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Overview

In consideration of the above described deficiencies or needs of digital systems (e.g., automotive systems) for functioning components with large dynamic ranges, low power, and inter-operability, processors (or microprocessors), a multiple dice system with separate or independent system-on-chips (SoCs) can have various peripheral components (e.g., non-volatile memory such as flash memory, direct memory access components, other circuit elements/components or other embedded technology) as part of each SoC integrated on a die. These peripheral components such as a flash memory can be fabricated as 130 or 250 nanometer devices, for example. Devices with this technology can also support higher voltages for input/output and analog functions like an analog to digital converters (e.g. 5V, which is a standard IO voltage in automotive designs). Because it is difficult to fabricate flash memory at smaller fabrication scales, the technology for flash memory cells is not always cost effective or feasible to get smaller. Thus, the cost for a memory cell can increase because the cost of a new technology. Even if new technologies are considered, the logic and FRAM components (e.g., as corresponding die peripheral components or as embedded with a core processor on the chip) can be fabricated smaller, but the flash or NVM components can pose difficulty for the same. In the past, large gains came in terms of performance (i.e. clock speed), but this particular area does not have as much momentum in growth so changes in the way micros are configured are demanded. As such, micros, which do not have a large non-volatile memory, can still be fabricated with Flash memory compatibility, but for the higher performance speed micros that are not compatible, new solutions are being sought.

Accordingly, in one example, a system can comprise multiple dices with corresponding SoCs each having an on-chip bus system that can manage communications or signaling thereat. For example, a first on-chip bus system can include an on-chip bus that controls or facilitates communications with peripheral components communicatively coupled to one or more first cores. A transparent interface/interconnect can operate to enable the first SoC with peripheral components and at least one corresponding first core to communicate transparently with a second SoC having one or more second peripheral components and at least one second core communicatively coupled via second on-chip bus system.

The transparent interface can communicatively couple the first and second dice with a consistent system address map that comprises unique and non-overlapping addresses of the first system address map and the second system address map. The consistent system address map can include a single system address (bus) map of the peripheral components along with corresponding cores without overlapping, re-directing, or re-mapping addresses. As such, the transparent interface can facilitate/enable communication signaling between different SoCs without overlapping, re-directing, or re-mapping operations for a transparent bus communication. Additional aspects and details of the disclosure are further described below with reference to figures.

Illustrated Embodiments

FIG. 1 illustrates a block diagram of an exemplary multiple dice system 100 configurable for high performance and adaptability for various applications such as safety relevant applications in automotive systems. The system 100 can comprise one or more configurable SoCs (e.g., SoCs 101 and 121) that include their own peripheral components corresponding to each die that can communicatively operate via on-chip bus protocols. Peripheral components can comprise any number of processing devices, memory cells, interconnects, filters, converters, comparators, sensors or other electronic processing components, such as a digital signal processor (DSP), graphic processor, direct memory access (DMA), crossbar, unidirectional bridge, or the other similar components.

A SoC can refer to an integrated circuit (IC) that integrates all components of a computer or other electronic system into a microprocessor chip or core, which can include digital, analog, mixed-signal, or radio-frequency functions—all on a single chip substrate with a corresponding communication protocol/on-chip bus protocol. In comparison, a system in package (SiP) can be referred to as multiple integrated circuits/semiconductor processor chips/dice enclosed in a single module (package), in which a SiP can perform all or most of the functions of an electronic system. The SiP can be integrated inside a mobile phone, digital music player, sensor system, automotive system, a related sub-system, or other system. Processing dies of SoCs can comprise integrated circuits that can be stacked vertically or in another orientation, for example, and can be internally connected by fine wires that are bonded to the package. Alternatively, with a flip chip technology, solder bumps can be used to join stacked chips together. The multiple dies discussed herein can be stacked vertically or tiled horizontally side by side to form a multiple dice architecture with different SoCs, for example.

In one example, the system 100 can include one or more SoCs 101 and 121 comprising one or more processor cores 102, 122, memory 104, 124—combined with passive components—resistors and capacitors—all mounted on the same board, substrate or silicon, for example, or communicatively coupled on separate dice. As such, a complete functional unit can be fabricated in a multi-chip system 100, so that few or no external components need to be added for operations among the different peripheral components and corresponding cores. This can be particularly valuable in space constrained environments like MP3 players and mobile phones as it reduces the complexity of the printed circuit board and overall design.

A first SoC 101, for example, can comprise the processor core 102 with hardware extensions that can be configured to process code received from the memory 104 or data received from a data memory 106 by way of one or more first on-chip buses as a first on-chip bus system 108. The program memory 104 can be configured to store test code that can be used to implement a software-based self-test, program code (for general processing) or other data. The system 100 can also comprise other components such as peripheral (device (s)) components 110 or interrupts, clocks, etc. 112, for example, which can be designated with addresses and utilized based on those address via the first on-chip bus system 108.

In one example, the first on-chip bus system 108 can enable the on-chip bus protocol of the SoC 101 to communicate, control or request data (e.g., by read, write, or re-write) to either one of the memories 104 or 106. The on-chip bus protocol can be specific to a master-slave protocol according to the architecture or configuration of the SoC 101. For example, the on-chip bus system 108 can utilize a first system address map 105, which could be stored in the memory 104, the data memory 106 or other component, for communicating or signaling one or more of the peripheral components 110 in response to an access request by the processor core 102.

Likewise, the second SoC 121 can operate with an on-chip bus protocol via the on-chip bus 128, which can further utilize a second system address map 125 embedded or as part of the memory 124 or data memory 126, for example. The on-chip bus protocols and the on-chip bus systems 108 and 128 can correspond respectively to the SoCs 101 and 121 with other components such as an arbitrator or interrupt service provider operable via the on-chip bus systems 108 and 128 at respective dies with system address maps to control or manage requests for resources (e.g., memory 104, peripheral components 110, or the like).

The memory 104, memory 106, and other peripheral components 110 of the SoC 101 can be fabricated or configured according to a different technology than the second SoC 121. For example, the first SoC 101 can comprise a non-volatile memory compatible based technology with a larger feature size than a smaller feature size of the second SoC configured according to a non-volatile memory incompatible based technology. In particular, the larger feature size of the first SoC 121 can enables compatibility for the communication with a Flash memory of the one or more first peripheral components, while the smaller feature size technology could be incompatible with communications between the second processor core 122 and a flash memory with the same fabrication size as the second processor core 122.

In an aspect, the processor core 102 of the first SoC 101 and the processor core 122 of the second SoC 121 can be different technologies, such as different speeds, fabrication sizes, or the like. The processor core 102 can be fabricated based on a technology that enables the processor core 102 to access and communicate with memories 104 or 106 as well as the peripheral devices 110, which can include non-volatile memories or components based on fabrication sizes (e.g., above about 20 nanometers) that are compatible with flash memory or other non-volatile memory as the memory 104 or 106.

Due to fabrication size differences with non-volatile memory arrays and a high speed processor (e.g., a FinFet microcontroller or a performance, extension, accelerator (PEAC) chip), the processor core 122 could be incompatible to interact or have access control to a non-volatile memory with a greater fabrication size (e.g., an advanced technology node below about 20 nm). Thus, the peripheral devices/components 130 of the second SoC, for example, could be without an embedded non-volatile memory, but could still utilize such non-volatile memory resource as part of the peripheral components 110 or 130 via the transparent (buses) interface 140. Additionally, the SoC 121 could also be with or without an external non-volatile memory.

In one embodiment, the transparent interface 140 can be configured to enable transparent communication between the first on-chip bus system 108 of the first SoC 101 and the second on-chip bus system 128 of the second SoC 140 in response to being communicatively coupled to one another. The transparent interface 140 can facilitate transparent communications between or among the SoCs 101, 121 based on a consistent system address map 145, which can comprise addresses that include unique and non-overlapping addresses from one another to memories, peripheral components, cores or other components. As such, each SoC 101, 121 of the system 100 can transparently access memories 104, 124 and 106 without re-mapping, re-directing or re-addressing addresses of these components. The transparent interface 140 can thus enable communication between the second on-chip bus system and any non-volatile memory (e.g., a Flash memory or the like) despite the technology or feature size of the processor cores 102, 122 or fabrication based technology by which each is manufactured, for example.

Alternatively or additionally, the SoC 121 can be a high speed SoC with high speed processors that operate at much higher speeds for processing compared to the SoC 101. The SiP 100 can further be able to configure its power consumption and have a flexible capability according to whether the SiP operates with only one SoC 101, both different types of SoCs 101 and 121 or other SoCs.

Similarly to the SoC 101, the SoC 121 includes the processor core 122, a memory 124 (e.g., a program code memory), interrupts, clocks, etc. 132 and one or more peripheral devices 130. The processor core 122, as with the processor core 102, can comprise one or more processors thereat, which can operate as master agents to the memories 124 or peripheral components 130. The SoC 121 can integrate the components (e.g., 122, 128, 130) thereat to form a complete and independent system on a chip via an on-chip bus protocol of a second on-chip bus interface 128 that is different from the on-chip bus interface 108.

In an aspect, when coupled with other SoCs (e.g., the first SoC 101), the master agents (e.g., the processor core 122) can operatively communicate based on various arbitration schemes or on-chip bus protocols throughout the system 100 for control of any of the components or resources via the transparent interface 140. The system 100 of multiple SoCs on different dices can be operable to include one or more SoCs 101, 121 and integrate these different SoCs 101, 121 with their corresponding on-chip bus protocols and components, for example.

In another aspect, one of the SoC 101 or the SoC 121 can optionally operate independently regardless of whether one is coupled to the other within the SiP 100. For example, the SiP 100 can integrate the SoCs 101 and 121 via the transparent interface 140, which operates so that each component of the SoCs 101 or 121 can be operable with a unique address that does not overlap any resources or components of system address maps corresponding to the SoC 101 or 121. As such, the transparent interface 140 can utilize a consistent system address map 145 that covers components of the entire system 100, including both SoCs 101 and 121. Likewise, the system 100 can be configured to operate independently without connectivity to one SoC or the other despite a transparent interface 140 enabling transparent integration. The transparent interface 140 further enable communication between the on-chip bus protocol of the on-chip buses 108 and 128 by allowing access to the various components of each SoC 101, 121 back and forth.

Figure 2:
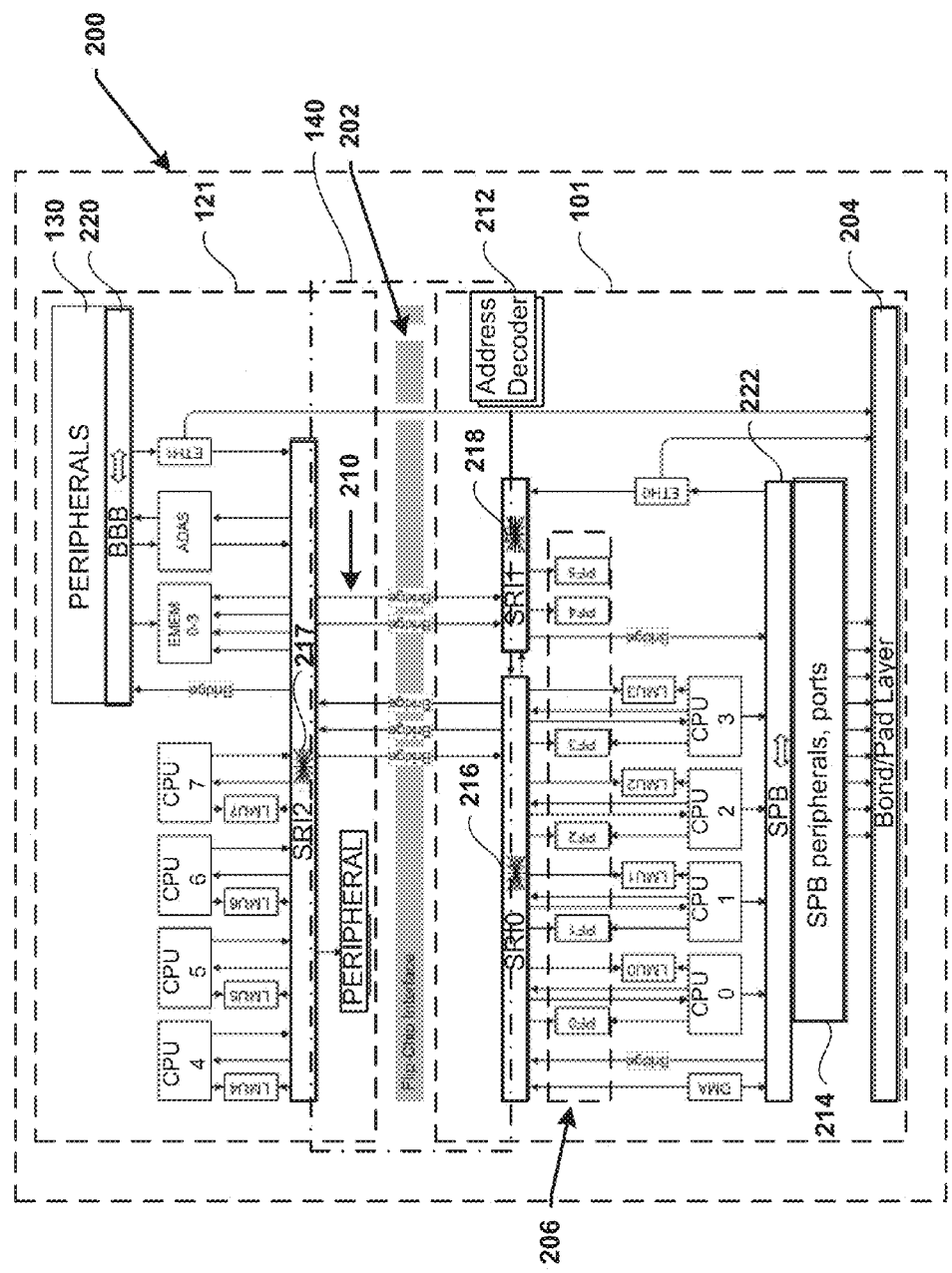
FIG. 2 is a block diagram illustrating another example of an SoC architecture on multiple dice with a transparent interconnect in accordance with various embodiments.

FIG. 2 illustrates another example multiple core system 200 having a transparent interface between different SoCs. The system 200 can operate as an scalable multi-core device with processing cores CPUs 0-7, which can operate as master agents capable of requesting or receiving control over one or more other devices/components as slaves in a master slave communication model of communication. Other components or devices as well can also be granted or configured to operate as master agents with one or more slave agents, which can include any one of local memory units (LMUs 0-7), program flash (PF 0-5), system peripherals (SPB), direct memory access (DMA) components, other processors (e.g., specialized digital signal processors, or the like), as well as hardware security modules, download accelerator managers, other units or components, for example, which are not limited herein.

The SoC 101 and 121 can operate as an integrated package for any combination of low to mid-range device/system(s) or higher end device/system(s) with faster processing speeds. The SoC 101 can operate with classical processing cores(s) or computer processing units (e.g., CPU 0-3) alone, and also be utilized to operate in conjunction with processor cores CPUs (e.g., CPU 0-3) of SoC 121 via the transparent interface 140, which can be similar to the transparent interface 140 of FIG. 1

In one example, the SoCs 101 and 121 could be similar to one another, in which both can be standard SoCs so that SoC 121 is similar or the same in processing capability as the SoC 101 with separate on-chip bus communication protocols. Alternatively or additionally, the SoCs 101, 121 or CPUs can be capable of different processing speeds or based on different technologies. For example, the SoC 121 can have a higher processing speed.

Additionally or alternatively, the SoC 121 can be fabricated or based on a different technology than the SoC 101 with a different or smaller fabrication size. An advantage of the SoC 101 comprising a standard SoC and the SoC 121 as a higher end, high processing speed SoC with a smaller fabrication size is in scalability of the software so that applications (e.g., automotive applications/systems with engine control units or the like) do not have to switch to different devices, different packages or systems external to the system 200, which can be scalable depending upon the demand for different technologies. The SoCs 101 and 121, for example, can transparently communicate across corresponding on-chip bus protocols of unique on-chip bus interfaces (e.g., 108 and 128 of FIG. 1) via the transparent interface 140, which enables master agents on one SoC to access slave agents on the other SoC via a consistent and non-overlapping system address map (e.g., address map 145 of FIG. 1). The SiP 200 can also operate with additional processing cores for flexibility as well as operate at a higher performance technology (e.g., FinFet or PEAC technology cores).

The system 200 can operate, for example, at 300 MHz at up to 175 degrees and have a 50,000 lifetime as well as with a zero ppm, which means out of over a millions of chips only one might fail in the field over a 15 year lifetime. In another example, the SiP 200 with SoCs 101 and 121 can operate in automotive systems such as an Engine Control Unit or other integrated system/sub-system, for example, where although some components/sub-systems could utilize higher processing speeds via the SoC 121 and switch to the lower processing speed SoC. Both SoCs could also be utilized on the same package or substrate via the transparent interface 140.

In another embodiment, one of the SoCs (e.g., the SoC 101) can comprise a bonding layer 204 with wire bonds, pads, pillars, or solder bumps that enable external access, and the SoC 121 can be without such bonds because the SoC 101 provides for them via the transparent interface 140. Thus, the bonding layer 204 can enable external communications from the SiP 200. In applications or instances where a lower processing chip with larger fabrication size (e.g., the SoC 101) is all that is demanded, power can be saved or processing made more efficient by utilizing only the SoC 101 without the SoC 121, for example. In other situations, where a higher processing speed is demanded, the SoC 121 can functionally operate and utilize the peripherals and memory of the SoC 101 for higher performance gain and the flash memory operations thereat, which it otherwise may not be compatible with due to fabrication size being too small or other parameters, for example.

In one example, the SiP 200 can be integrated with a face down flip-chip interface 202. The SoC 101 and 121 can be integrated on a package substrate with a flip-chip interface 202, for example, so the active area of the chips is facing the substrate. Soldered connections can reside between the chips and the substrate, and inside the substrate connections can exist between the two chips as well.

Although a flip chip interface 202 is illustrated for a face down configuration, another embodiment can include wire bonds within the interface layer 202 for a side-by-side packaging or a flip-chip configuration can be utilized, for example. In other configurations, the SoCs 101 and 121 can reside face-to-face to one another, which means active layers of a die are facing each other. In this configuration, between the dies pillars or bumps (e.g., solder connections) can also exist. The embodiments herein are not limited to any one type of physical orientation or arrangement.

Illustrated below the flip-chip interface 202 combining the SoCs 101 and 121, the SoC 101 can comprise program flash (PF) memories 206. Each CPU 0-3 of the SoC 101, for example, can have a local PF0-3 or be configured with a separate NVM component (e.g., PF4-5) for all CPUs 0-3 of the SoC 101. As such, the SoC 101, together with the processor core CPUs 0-3 can be considered NVM compatible so that NVM memory resides locally on a local substrate or is part of the local on-chip bus protocol and fabricated to support communication with NVM as part of the SoC 101.

In an embodiment, the CPUs 0 to 3 can be coupled together via on chip bus/on-chip interconnects 216 of shared resource interconnects (SRIs 0-2) as part of respective on-chip protocols of on-chip buses. The on-chip bus protocols can be integrated via the transparent bus interface 140, in which the protocols that include interconnects such as crossbars as interconnects 216. In other examples, the on-chip protocol can be based on a packet oriented protocol or other protocol such as crossbar, network on a chip, multi-master protocol or the like, for example.

The transparent interface 140 can comprise the interconnects 216-218 that can operate as multiple cross points, matrices or collection of switches arranged in a matrix or other configuration to accommodate multiple different links in one SRI. The transparent interface 140 can further include bridges 210 between both SoCs 101 and 121. The interconnects 216-218 can be integrated as part of the SRIs for the transparent interface 140 to integrate the SoCs 101, 121 and function for inter-device cross-talk between corresponding on-chip bus protocols of each SoC interface (e.g., backbone bus (BBB) 220 or system peripheral bus (SPB) 222). The SPB 22 can be further used to connect or communicate with bond layer 204 via one or more ports or any number of internal or external peripheral components as well, such as memories, other devices, Ethernet ports (ETH 0-1), digital memory access (DMA), accelerators, arbitration components, external components, systems, sub-systems (e.g., Advanced Driver Assistance System (ADAS)), or other components of the SoC or as a SiP, for example.

On a functional level, the interconnects 216 of SRIs 0-2 can operate similar to a bus so that read or write operations can be generated with an address to any component of the SiP 200 across the flip-chip interface 202, even if the component is specific to the SoC 101, the SoC 121 or part of the specific on-chip bus protocol of the SoC 101 or 121. The interconnects 216-218 can be similar to an end-to-end connection on an implementation level, which means that each master CPU (e.g., any one of CPUs 0-7) can be directly connected with any or all slave CPUs (e.g., any one of CPUs 0-7 not a master) via the transparent interface 140.

The transparent interface 140 thus facilitates communication between master agents and slave agents in both directions, which can operate in parallel with different master agents talking to slave agents with one another or among both SoCs 101, 121. For example, each SoC 101 and 121 comprises its own interconnects with components (e.g., CPU, DMA or other components) assigned or provided master agent status as well as slave agents (e.g., memories, LMU, PF, or other components) being assigned as slave agents as part of a master-slave communication model of communication. The master agents (e.g., CPU 0-7) can access all connected slave agents (e.g., LMUs, PFs, peripherals, ports, etc.) according to a system address map, which is consistent and has no overlapping addresses corresponding to each component of both SoCs 101 and 121.

With a bus (e.g., BBB 220), for example, the bus itself can be a shared resource with the SOC 121, so the other CPUs have to wait to use the resource when any one of the master agents (e.g., CPUs 4-7, CPUs via transparent bus 140, or other components) are utilizing it. However, with the on-chip interconnects 216-218 as part of the transparent interface 140, different masters talking to different slaves can be running in parallel (concurrently, at the same time) on the same resource (e.g., SRIs 0-2), and only when different masters talk to the same slave agent (e.g., Ethernet port ETH1, or other components) would contention be possible so that arbitration schemes could be utilized such as by round robin schemes, time division multiple access schemes, or otherwise.

Any one of the CPUs 0-7, for example, can be implemented as a master agent capable of accessing designated slave agents like memories on the same SoC or across the transparent interface 140 to the other SoC, for example. Although each SoC 101, 121 is illustrated with CPUs 0-7, respectively partitioned across the flip-chip interface 202 and at separate core systems, additional processing cores can also be envisioned so that a multitude of CPUs operating as master agents can access one or more slave agents across the interconnects 216-218 or crossbars of SRIs 0-2.

The SRI0-2 can comprise groups or clusters of the interconnects 216-218 connected via bridges 210, as illustrated by the different arrows across the flip-chip interface 202, as part of an overall transparent interface 140 architecture. Each cluster or SRI0-7, for example, can have multiple master CPUs from CPUs 0-7 while resources or peripheral components 130 or 214 can operate as slave agents. Where, for example, two cluster SRIs exists on the same SoC (e.g., SRI0-1 216, 218), each can have four or five master CPUs, with each SRI cluster having a number of connections, such as about 16 connections, for example. Thus, 16 connections for two SRI clusters would comprise 32 connections, and with one crossbar (e.g., crossbar 216 or otherwise) 8×8=64 connections, as one example, which could be possible at the SRIs.

Each bridge 210 can comprise different unidirectional connections, for example, which further comprises a certain address or address range. A master agent, for example, can be provided at the arrow head, while a slave at the tail, or vice versa by convention, for example. The bridges 210, for example, can comprise a physical implementation of the connection, which could also comprise the flip chip interface 202. On a logical level, a slave agent or component at the cluster of on-chip interconnects or crossbar 216-218 of SRI0, or other SRI can represent a certain address range.

For example, if a particular CPU (e.g., CPU0) indicates a read operation for a certain memory (e.g., PF 4 or PF 5) or peripheral (e.g., 110), then an address decoder 212 can know what component to read, write or communicate with by utilizing an address decoder 212 to know where to route it; whether it is connecting to a specific slave CPU on the same interconnect cluster or crossbar (e.g., SRI0) or crosses over to a different slave agent across at another crossbar (e.g., SRI1) via a connection between crossbars or interconnect clusters 216 and 217. The address decoder 212 can be a part of the transparent interface 140 or utilize the consistent system address map 145 of FIG. 1. From a specific crossbar (e.g., SRI0) the address decoder 212 of a corresponding cross bar, SRI0 can know that a certain address range, or several address ranges that are on the other side of the bridge 210. Then each access grant that goes through these ranges will be routed to the corresponding bridge 210 to the address range. Then, SRI 2, for example, as the other side of the bridge 210, can examine the address again and know where this specific address is located (e.g., in CPU 7) to then route it to the slave of CPU 7, for example. As such, the software or application layer running on the one SoC (e.g., 121) can then transparently access the other SoC (e.g., 101) over these bridges 210, and vice versa in the opposite direction flow back and forth. Accordingly from a software perspective, the SiP 200 can operate as a single chip device even though two different SoCs 101 and 121 can be on the same substrate or otherwise integrated with different compatibilities (e.g., NVM compatibilities) or capabilities.

The SoCs 101 and 121 can further include various local memory units LMU 0-7 that can also operate as localities inside the CPUs CPU 0-7, respectively. As such, CPU ports can have local RAMs that can be accessed without any change in the state state of the interface line. This can allow data to be retrieved immediately without adding clock cycles, which can occur in response to accessing another RAM of another CPU, or if you have to go across a bridge between SRI clusters, for example.

In another embodiment, the SoCs 101 and 121 of the SiP can operate via the transparent interface 140 to access memories (e.g., non-volatile memory, volatile memory, or other similar memory), peripheral components or local resources as part of a non-uniform memory access (NUMA) protocol. For example, the CPU cores (e.g., CPU 4, 5, 6, or 7) of the SoC 121 can directly access components or slave agents of the SoC 101, which can be any device or component designated as a slave agent such as the one or more peripheral components, for example, with a unique address via the NUMA protocol, for example. The NUMA protocol refers to all CPUs being able to see or access the same address space, and if a component such as a CPU or DMA as a master agent accesses a specific address such as for a memory each master agent would obtain the same value as the other, or, in other words, access the same data. Depending on the location of a CPU or master agent, however, the path to the specific memory or component location on the SiP can be longer or shorter so the access time can be longer or shorter.

The transparent interface 140 can operate to reduce contention for components, devices or resources among the different SoCs 101, 121 that are accessing or vying for access to components with a different on-chip protocol or a different SoC than the originating SoC or SoC CPU. These access requests, access grants or communication operations can be facilitated via the transparent interface ensuring that the same value is seen or accessed with the same address across different on-chip protocols of the SoC interfaces (e.g., 110, 222, or specific SoC interface) or on-chip buses for different SoCs 101 and 121. From an application layer or a software perspective, therefore, the symbol for a particular location of the system 200 (the address of a specific data) can be accessed by either SoC or both SoC devices 101, 121 among one another's system components. Accordingly, multiple CPUs, despite the architectural number or configuration on a particular SoC, can access or control multiple slaves across different SoCs in parallel to transparently access programs, data or other components of the target SoC at the same time.

Figure 3:
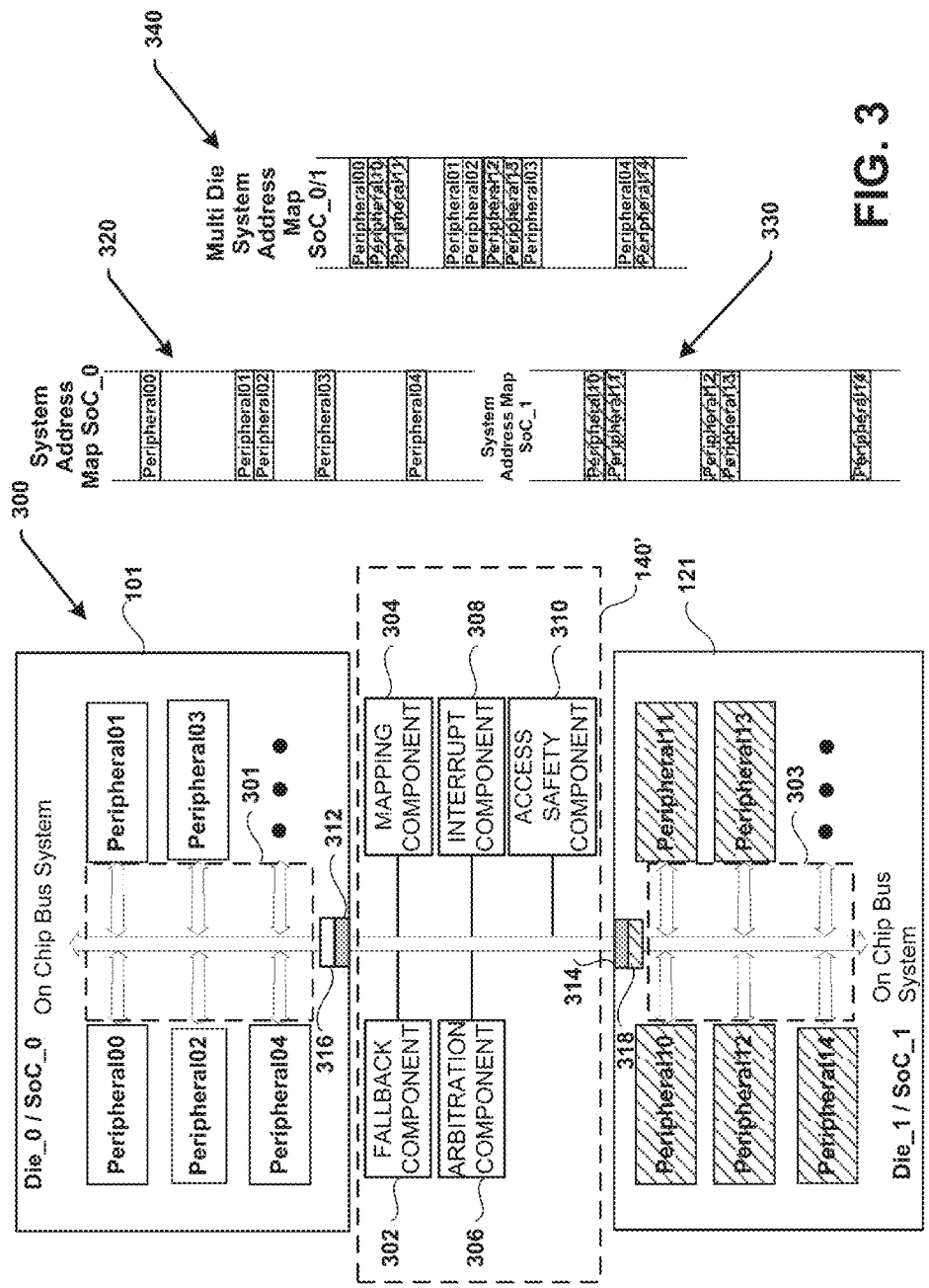
FIG. 3 is a block diagram illustrating another example of a SoC architecture on multiple dice with a transparent interconnect in accordance with various embodiments.

Referring to FIG. 3, illustrated is multi-core, multi-SoC system with a multiple die architecture. Although both the SoC 101 and 121 are interconnected via the transparent interconnect 140', as similar to the transparent interconnect 140 discussed above, either one can be configured as standalone components that could be operable to be configured as a system at various times, locations or application event triggers. Either a top die or bottom die (e.g., SoC 101 or SoC 121) can include all pads or bonding layer at one die or both.

Although the SoC 101 and SoC 121 have been described above with different fabrication technologies, sizes, speeds or have other differences, each could also be the same in other applications with a transparent interface 140' that integrates on-chip bus protocols of corresponding on-chip bus interfaces extending from and connected to components defined within a particular SoC. While the SoCs 101 and 121 can be configured as top dies and bottom dies, the orientation within a single SiP 300 can vary such that other orientations are also envisioned by one of ordinary skill in the art, such as dies fabricated adjacent or horizontal. Each SoC 101 and 121 can include different additional logic, processor cores, SRAM, NRAM, accelerators, DMAs, Ethernet or other network protocol ports, flash memory, other NVM or other components.

Both SoC dies 101 and 121 can be connected together by the transparent interface/interconnect 140', similar as in FIGS. 1 and 2 above, which connects on chip buses/interconnects of first and second SoCs. Both represent a system on-chip, which can communicate via on-chip bus interconnect that corresponds to and is unique to each SoC. As such, each SoC 101, 121 can operate independently. In one aspect SoC 101 and 121 could be combined and dynamically re-configured to interconnect so that each SoC's own on-chip protocol of corresponding local on-chip bus interfaces 301 and 303 is integrated via the transparent interface 140' with a consistent system address map without any address to any component overlapping or being duplicated.

The transparent interface 140', for example, can further include a fallback component 302, a mapping component 304, an arbitration component 306, an interrupt component 308, and an access safety component 310, for example. The fallback component 302 can be configured to detect a failure of a sub-system (e.g. an engine control unit subsystem, or other automotive sub-system) operating via the SoC 121, for example, having capabilities for higher processing speeds or with smaller fabrication sizes based on the technology relative to the other SoC 101, for example. In response to a failure condition, an event trigger or other performance indicator falling below or rising above a predetermined threshold, the fallback component 302 can initiate the NVM compatible SoC 101 to operate the automotive sub-system independently. Likewise, the reverse situation can also be configured via the fallback component 302, in which operation of one or more components or sub-systems are controlled from the SoC 101 and in response to an event controlled via the SoC 121.

Each SoC 101 and 121 comprises a system with unique address maps normally, where all the resources are address mapped, accessed through the on-chip bus interfaces 301, 303 and mapped on this system on-chip address map (e.g., address map 145 of FIG. 1) for integration via the mapping component 304 and for access via the transparent interface 140. The mapping component 304 can provide resources or components a unique address when accessing via the on-chip bus interconnects or interfaces 301, 303, for example, or via the transparent interface 140. The on-chip buses 301, 303 can be implemented based on their on-chip bus protocol and access among one another via the transparent interface 140 with a same unique address directly and while obtaining the same value or resource with the same address from any one component core, or SoC as another.

The mapping component 304 can generate a system address map that is visible through the transparent interface 140, or the on-chip bus interfaces 301 and 303, for example, without overlay, overlapping or re-mapping addresses. The SoCs 101 and 121 can thus be prepared to represent a transparent and consistent system address map (address map that is visible through the transparent interface 140) when the dice are connected together. In other words, the system address map is made to be aligned, or not overlap other addresses pre-configured and accessible via the respective on-chip interfaces 301 and 303, which can be in response to being integrated on the same SiP 300 as stand-alone devices or integrated devices on the same package substrate.

In one example, a master agent (e.g., a CPU, DMA or the other similar component) could be selected via the arbitration component 306 according to an arbitration scheme for access requests, and then facilitate a master-agent protocol that competes for bus access to a particular slave agent (e.g., a memory or other component). Different master agents can be arbitrated by a central arbitration algorithm of an arbitrator or the arbitration component 306, and based on one or more different algorithms different priorities can be assigned by the arbitration component 306, for example. The master agent (e.g., CPU, DMA or other similar component) among the SoCs 101, 121 that is provided an access grant by the arbitration component 306 can then initiate an access via the on-chip bus by providing the target (e.g., CPU, a peripheral, memory, or other component) access, and the slave agent accessed will react to this address state (including the target component address), some additional control signals, describing what master agent wants to do (read, write, re-write signal data, or for data or a data).

The on-chip bus interfaces 301 and 303 of the first and second SoC dies 101, 121 can be connected together to represent a transparent on-chip bus interconnect/interface 110 to represent a single on-chip architecture. This means that the transparent interface 140' can utilize the system address maps of each SoC without re-configuring the addresses, re-mapping or re-directing, but otherwise combine the addresses of each so that the address of the system overall is consistent and not overlapping any other address, which is illustrated further at system address maps 320, 330 and 340.

In another embodiment, the SoC 101 and 121 can be synchronized so that the on-chip buses 301 and 303 of both are connected together and can operate in a synchronous mode on the same clock (e.g., interrupts, clocks 112 or 132 of FIG. 1) from either the SoC 101 or the SoC 121. One or both SoC on-chip bus interfaces can include synchronization mechanisms 312 and 314 (e.g., on or more clocks, phase locked loops or other components) to enable both dice SoCs to run in asynchronous mode, where each bus can operate on different phases of a clock cycle, for example, which can be from analog parts such as a phase locked loop (PLL) that generates the on-chip clock. If both SoCs 101 and 121 are clocked by the same PLL or clock then the clocks (e.g., 112 and 132) can be are running at the same frequency, for example, so they are not running in asynchronous mode. Asynchronous mode could occur when the other on-chip bus is using, for example, a clock of 200 MHz and the other is clocked at 133 MHz, or some other difference in frequency. If both are clocked at 200 MHz then the SiP 300 can be used in a synchronous way. The SoCs 101 and 121 can differ as well in that the SoC 121 can be simpler without bond pads, for example, and be synchronized with the SoC 101 using the same clock phase. This can have the advantage that additional synchronization stages are unnecessary, which is beneficial for the access latency and the throughput through the transparent interconnect.

The access requests can involve synchronizing, via a handshake protocol of the arbitration component 306, an arbitration between a first arbitration component 316 of the first on-chip bus and a second arbitration component 318 of the second on-chip bus, for example. This arbitration method can also include arbitrating, via the transparent interface 140', access requests from master agents of the first SoC and the second SoC to the unique and non-overlapping addresses of the system address map corresponding to first peripheral components or the second peripheral components. The access requests can involve synchronizing, via a handshake protocol, arbitration between the first arbitration component 316 as part of the first on-chip bus 301 and the second arbitration component 318 of the second on-chip bus, for example.

In an aspect, the access requests that are winning access grants can be forwarded to the arbitration component 306 or the other arbitration component of the other SoC where the master agents of both can be determined access grants. In an example, the first arbitration component 316 or the arbitration component 318 alone can generate arbitration operations while the other one is disabled in response to the handshake protocol or a further arbitration at the arbitration component 306. The access grants alternatively or additionally could be combined from the master agents of the first SoC and the second SoC, where further arbitration can occur with all requests at the arbitration component (e.g., 306) of the transparent interface (e.g., 140 or 140').

In another embodiment, the address map of each respective SoC 101 and 121 can be illustrated as an example by address maps 320 and 330 as local system die address maps. The mapping component 304 can operate to generate and combine respective address maps so that both together can represent a consistent address map 340, which means there is no overlap and each component is provided a unique address from among all components of the SiP 300. The addresses of the address map 340 can be an absolute address where each is used in a unique way, and there is no slave agent or peripheral component that uses the same absolute address on the first and the second SoCs 101 and 121. Thus, a master CPU agent can use an address, and know each address is unique without any two agents subject to selection or contention.

Each SoC 101, 121 can include its own system address map (e.g., 105 and 125 of FIG. 1) to devices or components located at or on the SoC, and each SoC 101, 121 can be utilized independent of the other. In response to being connected together, SoCs 101 and 121 can represent and operate as a single SoC with a single system address map (e.g., 145 of FIG. 1) without overlap or overlapping addresses. For example, an operational or processing task (e.g., a software task or other task) being utilized on SoC1 (e.g., SoC 121), SoC2 (e.g., SoC 101) or both can be mapped to a CPU or other master agent on SoC1 or other SoC without any re-compiling or address re-mapping operations.

A master agent on one SoC (e.g., SoC1) can receive or acquire full access to the on-chip resources, devices or components designated as slave agents connected to the other SoC0 via the transparent interconnect 140' and vice versa. Thus, any component or device (e.g., a CPU on SoC 121) designated as a master agent such as via an assigned tag (e.g., Tag ID) could then access or control data on any other component (e.g., Peripheral(s) 10-13, Peripheral(s) 00-03, or other) designated as a slave agent, either locally on SoC 121 via the on-chip buss system 303 or on other SoCs via the transparent bus interface 140'.

In another embodiment, the interrupt component 308 can be configured to route interrupt signals to one or more interrupt service providers (e.g., master agents such as a CPU or DMA) of the SoC 101 and of the SoC 121 by a mapping of interrupt nodes via the transparent interface 140. Applications (e.g., automotive applications, software layers, application protocol layers) on systems can be interrupt driven, in which a slave component (e.g., a communication slave) can have on-chip events (conditions, thresholds, indicators, detection events, etc.), and these on-chip events can be forwarded as interrupts of the service request to the CPUs or DMA to do an operation or action.

The interrupt systems of each SoC can thus be transparently connected together via the interrupt component 308 or the transparent interface 140', for example. The interrupt systems of SoC0 and SoC1 can thus be connected so that interrupts from SoC0 can be routed to interrupt service providers (e.g., CPUs, DMAs, or other master agents) on SoC1. The interrupt component 308, the arbitration component 306 or arbitration processes of the transparent interface 140' can then operate to arbitrate the interrupts together with the interrupt sources on SoC1 and winner or winning agent can be handed over to the related interrupt service provider on SoC1, and vice versa across the transparent interface 140'.

For example, a channel (e.g., a DMA channel) can be triggered via an interrupt, which executes a transaction and signals a CPU via interrupt that the transaction was executed. With a communication interface (e.g., the transparent interface 140'), when a bus or component receives a message, an interrupt can be sent to a peripheral component, memory, other component (e.g., a DMA or the like), or any interrupt source. The peripheral or slave agent can then transfer the data or message to a CPU and signals via interrupt to the CPU the message data via the on-chip interface 140, 301, or 303. The interrupt component 308 can thus operate to map interrupts to on-chip resources (e.g., NVM, RAM or other peripheral components).

For example, with multiple CPUs/DMAs with a lot of channels, to enable the customer to use the on chip resources in a flexible way, interrupts can be mapped to CPUs/DMA channels by the interrupt component 308, for example. This can be configured and is both beneficial to have flexibility and mapping of interrupts to CPUs and DMA channels. The transparent interface 140 thus is enabled to have a common interconnect system between two or more SoCs with peripheral component integrated thereat. Depending on the combination architecture of the SoCs 101, 121 the interrupt system can adapt, include almost a multiplicity (e.g., 128 or more) interrupt nodes, and each hardware can be joined in an interconnect node with each hardware event dedicated to a hardware node. A hardware event can be connected to a node and be requested by a service request via an interrupt service provider (or master agent) as result of the interrupt component 308 or other component mapping the request(s) to one of a CPU channel or a DMA channel, in which this hardware event can be configured via the interrupt component 308 by giving it a priority number, for example.

In one example, a release buffer as a peripheral of a servicing interface (e.g., interface 140) can be utilized when the servicing interface receives data. The according to the configuration it can send an interrupt to an interrupt node (e.g., a software node or hardware node address). The interrupt node can be configured by the interrupt component 308 providing that this interrupt can be forwarded to CPU 0, for example, which can be designated with a priority (e.g., as priority 64), or it can be mapped to the DMA on a DMA channel 64, for example, via the interrupt component 308.

This interrupt system mapping can then have an interface to each interrupt service provider which is either a CPU or a DMA, or other peripheral.

In another embodiment, the master agents can be designated with an access protection mechanism by the access safety component 310. For example, the access safety component 310 can designate or provide a tag identifier (ID), a tagged data set or other data tag to various master agents/slave agents that can enable other components or agents to recognize a particular component (e.g., CPU or DMA) as a master agent or a slave agent. Slave agents can be provided with tags also designating them as assigned or corresponding for use with any master agent, particular master agents, or for particular uses or applications, such as an automotive application or engine control unit (processor) of an automotive system. For example, a tag ID (or other identifying data or dataset) can be used by master agents and the slave agents for recognizing designated master agents or any component seeking a granted access via arbitration by the arbitration component 306 or an interrupt service provider routine by the interrupt component 308, for example.

In an on-chip bus system with a system address map (e.g., as part of the mapping component 304 or system address map 145 of FIG. 1) master agents can access on-chip resources in slave agents (e.g., peripheral00 thru peripheral13 or additional components) by sending out the target address (e.g. the address of the register in a slave that the master agent wants to access). The master agents (e.g., CPUs 0-7 of FIG. 2) can send out the address together with a unique Master TAG ID that identifies the master agent related to the on-chip bus transaction. The slave agent can then be identified/selected by the address the master agent has sent out. Now it can be said that each slave agent can also have a unique TAG or other identification data that identifies the master agent to which it serves or itself. This identifying dataset (or slave tag) can be the offset of the slaves' address range in the system address map 145, for example. However, because an address ranges of a slave agent can be different (e.g. one with 1 KB, another one 128 KB) the number of address offset bits can also be different.

All tag IDs (or identifying data sets) on the SoCs 101 and 121 can be unique, in which there is no overlap, just as the addresses of the system address map 145 have no overlap. Thus, there is no master function on SoC 101 and 12 using the same tag ID or data set for encoding. Each master component, for example, can be implemented with one or multiple unique master tag IDs. For example, the tag ID can be, for example, a six bit value, such that with six bits enables 62 encodings or 64 encodings, or some another number of bits can be envisioned. Whenever a master component is granted bus access, if it initiates with an address phase, part of this phase can include a master tag ID. On the slave agent side, control registers (e.g., one or more peripherals) can further determine which access tag IDs are able to access the slave. This can mean that multiple CPUs can be designed as on-chip resources or peripherals to different master agents (e.g., CPUs) or to different tag IDs. This process or operation can be further used for source end encapsulation, for example, where one CPU is used by a third party software and it can be ensured that the software of a third party or provider is able or not to access other sources but the software would be detected and not executed if not allowed to or granted a permission with the tag ID.

As such, depending on the application software or application layer, certain CPUs can be used via the access safety component 310 as a master agent with particular slave agents depending on the tag ID that is invoked by the application. For the transparent interface 140 no particular tag ID is necessarily used by more than one component or more than one at a time. In other words, no master or component on the SoC 101 uses the same tag ID as a master or component on the SoC 121, so it is transparent in access and also in tag ID across the transparent interface 140.

The access safety component 310 can be further configured to extend additional error correction code protection via the transparent interface 140 to include both the on-chip bus protocol utilized on the compatible SoC 101 and the second on-chip bus protocol utilized on the second SoC 121 in communications across the two, for example. The access safety component 310 can operate to extend error correction code (ECC), error detection code (EDC), other communication check or parity code, for example, across the on-chip interfaces 301 and 303 extended with additional ECC protection so that the error correction code/error detection code operations at each SoC are integrated.

For example, this means that once a master agent is granted, it can initiate with an address phase. This address phase can include an address and an operation code that tells the slave agent what the master wants to do. It can further include whether there is a single data transaction or a multi data transaction, and some control signals (e.g., a read/write signal), a unique check identification (ID) of the master agent where the slave can see which master wants to access it. As such, the access safety component 310 can also be an error correction/detection code component so that the interface 140 between a first and second on chip bus 301 and 303 is protected according to an extended on-chip protection protocol, which can accommodate or incorporate automotive safety integrity level (ASIL) safety standards at each and both SoCs.

Figure 4:
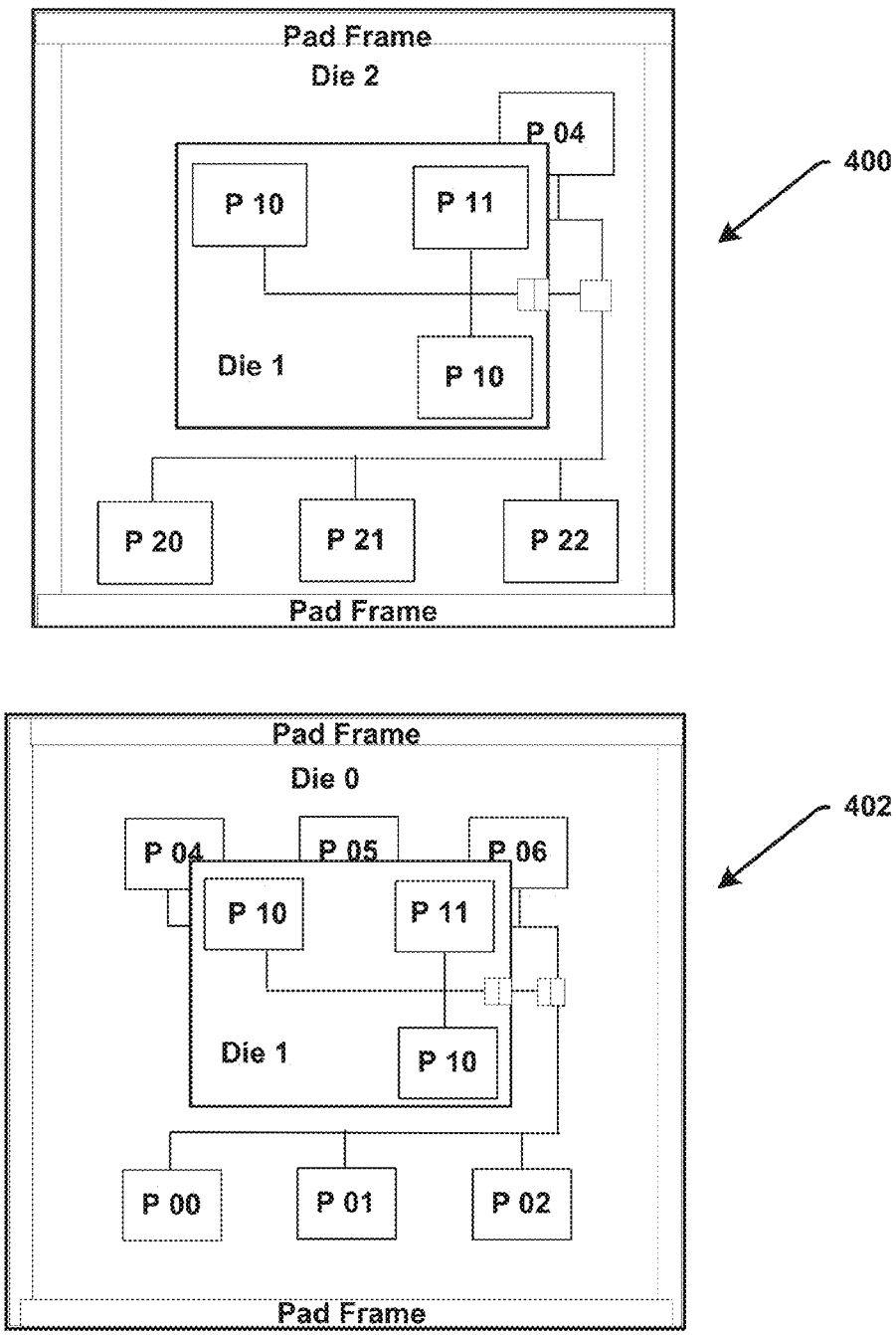
FIGS. 4-5 are additional block diagrams illustrating another example of an SoC architecture on multiple dice with a transparent interconnect in accordance with various embodiments.
Figure 5:
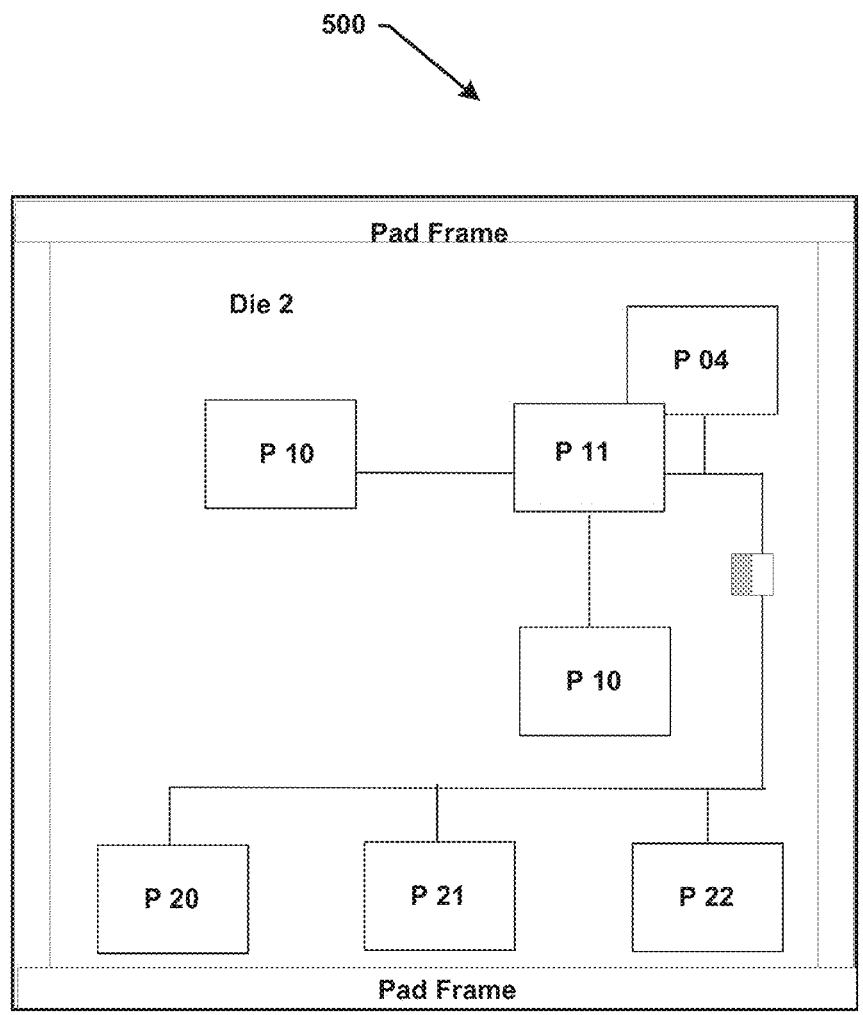

Referring to FIGS. 4-5, illustrated are examples of different combinations of the SoCs 101 and 121 to generate different SiP configurations 400, 402 and 500. The two SoCs 101 and 121 can include a corresponding set of addresses to components thereat in a respective system address map, which is combined or integrated transparently without overlapping, duplication or re-mapped addressed in a consistent system address map covering all SoCs. For example, the same SoC (e.g., Die or core 1 as SoC 101 or 121) of an SiP or other combined system discussed herein (e.g., SiP 100, 200 or 300) can be integrated or connected to different bottom chips (Die 2) or SoCs, or different bottom chips can be attached to different applications with different chips size, different pad frame, and/or different functionality. The bottom chip (e.g., SoC 101 could also be utilized as a stand-alone product. Die 1 can be used with Die zero, and other times with die 2, or as a stand-alone product.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
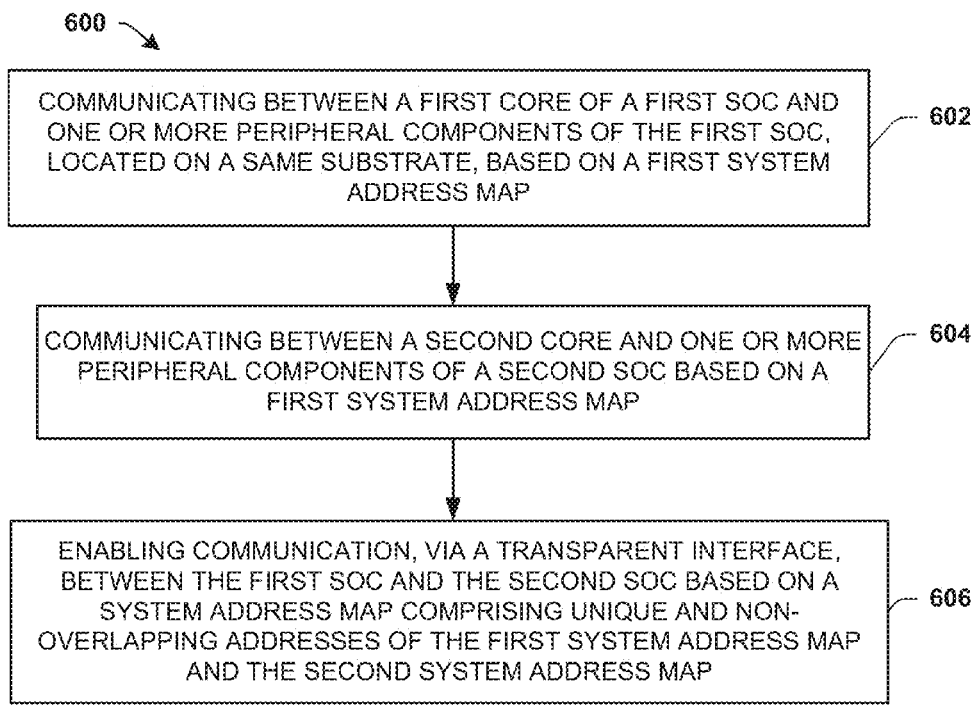
FIG. 6 is a flow diagram illustrated for a multiple-core SoC architecture on multiple dice in accordance with various embodiments.

Referring to FIG. 6, illustrated is a method 600 for a multiple core, multiple SoC system in accordance with various aspects described herein. At 602, the method includes communicating, via a first on-chip bus protocol of a first system on-chip (SoC) interface (e.g., 301), between a first core (e.g., CPU 0) and one or more peripheral components located on a same substrate of the first SoC (e.g., SoC 101) based on a first system address map with first addresses corresponding to the first peripheral components and the first core.

At 604, the method includes communicating, via a second on-chip bus on a second SoC (e.g., SoC 121), between a second core and one or more of a plurality of second peripheral components of the second SoC based on a second system address map with addresses corresponding to the second peripheral components and the second core.

At 606, the method comprises enabling communication, via a transparent interface, between the first SoC and the second SoC based on a system address map comprising unique and non-overlapping addresses of the first system address map and the second system address map.

The method can also include arbitrating, via the transparent interface, access requests from master agents of the first SoC and the second SoC to the unique and non-overlapping addresses of the system address map corresponding to the plurality of first peripheral components or the plurality of second peripheral components. The access requests can involve synchronizing, via a handshake protocol, arbitration between a first arbitration component of the first on-chip bus and a second arbitration component of the second on-chip bus, for example. The access requests can be arbitrated from the master agents of the first SoC via a first arbitration component of the first on-chip bus and disabling a second arbitration component of the second on-chip bus in response to the handshake protocol. The access grants can then be combined from the master agents of the first SoC and the second SoC, where further arbitration can occur with all requests at the arbitration component (e.g., 306) of the transparent interface (e.g., 140 or 140').

The method can further include providing access, via the transparent interface, for the second SoC component, with a second core to the first NVM compatible core, the one or more peripheral components and the non-volatile memory of the first SoC with a unique address via a non-uniform memory access (NUMA) protocol. The second core can comprise a different technology based fabrication size (e.g., a smaller size) than the first core of the first SoC. The smaller fabrication size, for example, could render the second core non-compatible with nonvolatile memory or other components at fabrication sizes of less than 20 nm, for example.

The second core could also be a operated at a different operating frequency than the first core. The different frequencies can be synchronized with one another or asynchronous, for example, via the transparent interface 140. For example, the first core can comprise a first CPU configured to operate at a first frequency via the first on-chip bus protocol and the second core comprises a second CPU configured to operate at a second frequency that is different than the first frequency via the second on-chip bus protocol. The first on-chip bus protocol of the first on-chip bus system and the second on-chip bus protocol of the second on-chip bus system can thus operate in a synchronous mode with respect to one another, in which the transparent interface can be synchronized to or synchronize both on-chip bus frequencies of the first on-chip bus system and the second on-chip bus system with respect to communications therethrough.

The first on-chip bus protocol of the first on-chip bus system and the second on-chip bus protocol of the second on-chip bus system can also be configured to operate in an asynchronous mode with respect to one another, and the transparent interface can be synchronized to only one of the first on-chip bus system or the second on-chip bus system. The first on-chip bus system can also comprise a phase locked loop or clock configured to generate a clock that corresponds to operations of the first on-chip bus system and the second on-chip bus system.

The method can also include determining, via an arbitration component 306, priorities corresponding to the addresses of the address map and arbitrating communications to the addresses of the address map based on the first on-chip bus protocol of the first SoC interface and the second on-chip bus protocol of the second SoC interface. The method further comprises extending, via a access safety component 310, additional error correction code protection via the transparent interface to include both the first on-chip bus protocol utilized on the first NVM compatible SoC and the second on-chip bus protocol utilized on the second SoC component from one of the first NVM compatible SoC or the second SoC component. The method can further comprise routing, via an interrupt component 308, interrupt signals among master core processors and slave processors of the first NVM compatible SoC and of the second SoC component by mapping interrupt nodes via the transparent interface.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Example 1 is a system for a multiple chip architecture comprising: a first system on-chip (SoC), located on a substrate, comprising a first core, one or more first peripheral components, and a first on-chip bus system with a first system address map, wherein the first on-chip bus system is configured to enable access with a first on-chip bus protocol between the first core and the one or more first peripheral components based on the first system address map; a second SoC comprising a second core, one or more second on-chip peripheral components and a second on-chip bus system with a second system address map, wherein the second on-chip bus system is configured to enable access with a second on-chip bus protocol between the second core and the one or more second peripheral components; and a transparent interface configured to enable communication between the first on-chip bus system of the first SoC and the second on-chip bus system of the second SoC in response to being communicatively coupled to one another based on a consistent system address map comprising a plurality of addresses that include unique and non-overlapping addresses from one another.

Example 2 includes the subject matter of Example 1, wherein the first core comprises a first computer processing unit (CPU) configured to operate at a first frequency via the first on-chip bus protocol and the second core comprises a second CPU configured to operate at a second frequency that is different than the first frequency via the second on-chip bus protocol.

Example 3 includes the subject matter of any one of Examples 1-2, including or omitting any elements, wherein the first on-chip bus protocol of the first on-chip bus system and the second on-chip bus protocol of the second on-chip bus system are configured to operate in a synchronous mode with respect to one another, and wherein the transparent interface is synchronized to both on-chip bus frequencies of the first on-chip bus system and the second on-chip bus system.

Example 4 includes the subject matter of any one of Examples 1-3, including or omitting any elements, wherein the first on-chip bus protocol of the first on-chip bus system and the second on-chip bus protocol of the second on-chip bus system are configured to operate in an asynchronous mode with respect to one another, and wherein the transparent interface is synchronized to only one of the first on-chip bus system or the second on-chip bus system.

Example 5 includes the subject matter of any one of Examples 1-4, including or omitting any elements, wherein the first on-chip bus system comprises a phase locked loop configured to generate a clock that corresponds to operations of the first on-chip bus system and the second on-chip bus system.

Example 6 includes the subject matter of any one of Examples 1-5, including or omitting any elements, wherein the first SoC is configured according to a non-volatile memory compatible based technology with a first feature size that is different from a second feature size of the second SoC configured according to a non-volatile memory incompatible based technology, wherein the first feature size enables compatibility for the communication with a Flash memory of the one or more first peripheral components, wherein the transparent interface is further configured to enable communication between the second on-chip bus system and the Flash memory.

Example 7 includes the subject matter of any one of Examples 1-6, including or omitting any elements, further comprising: a fallback component configured to, in response to a detection of a failure of the first SoC or the second SoC, enable an other of the first or the second SoC to operate a sub-system via the transparent interface.

Example 8 includes the subject matter of any one of Examples 1-7, including or omitting any elements, wherein the first on-chip bus system comprises a first arbitration component configured to control arbitration of access requests from a plurality of master agents of the first SoC, while a second arbitration component of the second on-chip bus system is at least partially disabled, and combine access grants from the second arbitration component and the plurality of master agents of the first SoC.

Example 9 includes the subject matter of any one of Examples 1-8, including or omitting any elements, wherein the transparent interface is further configured to provide a protection component between the first on-chip bus protocol and the second on-chip bus protocol by enabling error correction code/error detection code of the first SoC and the second SoC to transparently extend coverage of the consistent system address map with the unique and non-overlapping addresses between the first SoC and the second SoC.

Example 10 includes the subject matter of any one of Examples 1-9, including or omitting any elements, wherein the first on-chip bus system comprises a first interrupt component configured to arbitrate among interrupts mapped to the second SoC, and route winning interrupt signals to a second interrupt component of the second on-chip bus system via the transparent interface.

Example 11 includes the subject matter of any one of Examples 1-10, including or omitting any elements, wherein the first on-chip bus system and the second on-chip bus system comprise one or more access protection components configured to assign one or more unique tag identifiers (IDs) to one or more master agents, wherein the one or more unique tag IDs enable slave agents to identify the corresponding master agents and further enable transparent access via the transparent interface to the one or more first on-chip peripheral components or the one or more second on-chip peripheral components based on the one or more unique tag IDs.

Example 12 is a method for a system comprising: communicating, via a first on-chip bus on a first system on-chip (SoC), between a first core and one or more of a plurality of first peripheral components, located on a same substrate, based on a first system address map with first addresses corresponding to the plurality of first peripheral components and the first core; communicating, via a second on-chip bus on a second SoC, between a second core and one or more of a plurality of second peripheral components of the second SoC based on a second system address map with addresses corresponding to the plurality of second peripheral components and the second core; and enabling communication, via a transparent interface, between the first SoC and the second SoC based on a system address map comprising unique and non-overlapping addresses of the first system address map and the second system address map.

Example 13 includes the subject matter of Example 12, further comprising: arbitrating, via the transparent interface, access requests from master agents of the first SoC and the second SoC to the unique and non-overlapping addresses of the system address map corresponding to the plurality of first peripheral components or the plurality of second peripheral components.

Example 14 includes the subject matter of any one of Examples 12-13, including or omitting any elements, wherein the arbitrating the access requests further comprises: synchronizing, via a handshake protocol, arbitration between a first arbitration component of the first on-chip bus and a second arbitration component of the second on-chip bus; arbitrating access requests from the master agents of the first SoC via the first arbitration component of the first on-chip bus and disabling a second arbitration component of the second on-chip bus in response to the handshake protocol; and combining access grants from the master agents of the first SoC and the second SoC.

Example 15 includes the subject matter of any one of Examples 12-14, including or omitting any elements, further comprising: extending an error correction code protection/error detection code protection via the transparent interface to include both a first on-chip bus protocol utilized by the first on-chip bus and a second on-chip bus protocol by the second on-chip bus.

Example 16 includes the subject matter of any one of Examples 12-15, including or omitting any elements, further comprising: operating the first core with one or more first computer processing units and the second core with one or more second computer processing units having different operating frequencies than the first computer processing units.

Example 17 includes the subject matter of any one of Examples 12-16, including or omitting any elements, further comprising: enabling, via the transparent interface, communication with a non-volatile memory of the plurality of first peripheral components at the first SoC from the second SoC comprising a smaller feature size than the first SoC that makes the second on-chip bus incompatible with any non-volatile memory on the second SoC.

Example 18 is an apparatus for a multiple chip architecture comprising: a first system on-chip (SoC), comprising a first core and one or more first peripheral components on a substrate, configured to enable communication among the first core and the one or more first peripheral components via a first on-chip bus protocol of a first on-chip bus based on a first system map with a first plurality of addresses corresponding to the first core and the one or more first peripheral components; and a transparent interface configured to enable communication between the first on-chip bus and a second on-chip bus of a second SoC when coupled to one another based on a consistent system address map comprising unique and non-overlapping addresses corresponding to the first core, the one or more peripheral components, a second core of the second SoC and one or more second peripheral components of the second SoC, wherein the second core and the one or more second peripheral components are configured to communicate among one another via the second on-chip bus based on a second system map.

Example 19 includes the subject matter of Example 18, including or omitting any elements, wherein the first on-chip bus system comprises a first arbitration component configured to control arbitration of access requests from a plurality of master agents of the first SoC while a second arbitration component of the second on-chip bus system is at least partially disabled, and combine access grants from the second arbitration component and the plurality of master agents of the first SoC to determine winning grants for access to a slave agent.

Example 20 includes the subject matter of Example 18 or 19, including or omitting any elements, wherein the first SoC and the second SoC are coupled together on a same substrate, and one of the first SoC or the second SoC comprises a physical connection pad while an other one of the first SoC or the second SoC is without any physical connection pad and configured to communicate with external components via the physical connection pad.

Example 21 includes the subject matter of any one of Examples 18-20, including or omitting any elements, wherein the transparent interface utilizes a single phase locked loop located at one of the first SoC or the second SoC to control a synchronization of communications of between the first SoC and the second SoC.

Example 22 includes the subject matter of any one of Examples 18-21, including or omitting any elements, wherein the transparent interface is configured to enable communication between the second on-chip bus system and a Flash memory of the one or more first peripheral components of the first SoC, wherein the first SoC, wherein the first SoC is configured according to a non-volatile memory compatible based technology with a larger feature size than a smaller feature size of the second SoC configured according to a non-volatile memory incompatible based technology, wherein the larger feature size enables the communication with a Flash memory of the one or more first peripheral components.

Example 23 includes the subject matter of any one of Examples 18-22, including or omitting any elements— wherein the first on-chip bus system and the second on-chip bus system comprise one or more access protection components configured to assign one or more unique tag identifiers (IDs) to one or more master, wherein the one or more unique tag IDs enable slave agents to identify the corresponding master agents and further enable transparent access via the transparent interface to the one or more first on-chip peripheral components or the one or more second on-chip peripheral components based on the one or more unique tag IDs.

Example 24 includes the subject matter of any one of Examples 18-23, including or omitting any elements, wherein the first on-chip bus system comprises a first interrupt component configured to arbitrate among interrupts mapped to the second SoC, and route winning interrupt signals to a second interrupt component of the second on-chip bus system via the transparent interface.

Example 25 includes the subject matter of any one of Examples 18-24, including or omitting any elements, the first SoC is further configured to signal one or more interrupt triggers to an interrupt service provider on the second SoC via one or more dedicated interrupt trigger connections.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A system for a multiple chip architecture comprising:
a first system on-chip (SoC), located on a substrate, comprising a first core, one or more first peripheral components, and a first on-chip bus system with a first system address map, wherein the first on-chip bus system is configured to enable access with a first on-chip bus protocol between the first core and the one or more first peripheral components based on the first system address map;
a second SoC comprising a second core, one or more second on-chip peripheral components and a second on-chip bus system with a second system address map, wherein the second on-chip bus system is configured to enable access with a second on-chip bus protocol between the second core and the one or more second peripheral components; and
a transparent interface configured to enable communication between the first on-chip bus system of the first SoC and the second on-chip bus system of the second SoC in response to being communicatively coupled to one another based on a consistent system address map comprising a plurality of addresses that include unique and non-overlapping addresses from one another.

2. The system of claim 1, wherein the first core comprises a first computer processing unit (CPU) configured to operate at a first frequency via the first on-chip bus protocol and the second core comprises a second CPU configured to operate at a second frequency that is different than the first frequency via the second on-chip bus protocol.

3. The system of claim 1, wherein the first on-chip bus protocol of the first on-chip bus system and the second on-chip bus protocol of the second on-chip bus system are configured to operate in a synchronous mode with respect to one another, and wherein the transparent interface is synchronized to both on-chip bus frequencies of the first on-chip bus system and the second on-chip bus system.

4. The system of claim 1, wherein the first on-chip bus protocol of the first on-chip bus system and the second on-chip bus protocol of the second on-chip bus system are configured to operate in an asynchronous mode with respect to one another, and wherein the transparent interface is synchronized to only one of the first on-chip bus system or the second on-chip bus system.

5. The system of claim 1, wherein the first on-chip bus system comprises a phase locked loop configured to generate a clock that corresponds to operations of the first on-chip bus system and the second on-chip bus system.

6. The system of claim 1, wherein the first SoC is configured according to a non-volatile memory compatible based technology with a first feature size that is different from a second feature size of the second SoC configured according to a non-volatile memory incompatible based technology, wherein the first feature size enables compatibility for the communication with a Flash memory of the one or more first peripheral components, wherein the transparent interface is further configured to enable communication between the second on-chip bus system and the Flash memory.

7. The system of claim 1, further comprising:
a fallback component configured to, in response to a detection of a failure of the first SoC or the second SoC, enable an other of the first or the second SoC to operate a sub-system via the transparent interface.

8. The system of claim 1, wherein the first on-chip bus system comprises a first arbitration component configured to control arbitration of access requests from a plurality of master agents of the first SoC, while a second arbitration component of the second on-chip bus system is at least partially disabled, and combine access grants from the second arbitration component and the plurality of master agents of the first SoC.

9. The system of claim 1, wherein the transparent interface is further configured to provide a protection component between the first on-chip bus protocol and the second on-chip bus protocol by enabling error correction code/error detection code of the first SoC and the second SoC to transparently extend coverage of the consistent system address map with the unique and non-overlapping addresses between the first SoC and the second SoC.

10. The system of claim 1, wherein the first on-chip bus system comprises a first interrupt component configured to arbitrate among interrupts mapped to the second SoC, and route winning interrupt signals to a second interrupt component of the second on-chip bus system via the transparent interface.

11. The system of claim 1, wherein the first on-chip bus system and the second on-chip bus system comprise one or more access protection components configured to assign one or more unique tag identifiers (IDs) to one or more master agents, wherein the one or more unique tag IDs enable slave agents to identify the corresponding master agents and further enable transparent access via the transparent interface to the one or more first on-chip peripheral components or the one or more second on-chip peripheral components based on the one or more unique tag IDs.

12. A method for a system comprising:
communicating, via a first on-chip bus on a first system on-chip (SoC), between a first core and one or more of a plurality of first peripheral components, located on a same substrate, based on a first system address map with first addresses corresponding to the plurality of first peripheral components and the first core;
communicating, via a second on-chip bus on a second SoC, between a second core and one or more of a plurality of second peripheral components of the second SoC based on a second system address map with addresses corresponding to the plurality of second peripheral components and the second core; and
enabling communication, via a transparent interface, between the first SoC and the second SoC based on a system address map comprising unique and non-overlapping addresses of the first system address map and the second system address map.

13. The method of claim 12, further comprising:
arbitrating, via the transparent interface, access requests from master agents of the first SoC and the second SoC to the unique and non-overlapping addresses of the system address map corresponding to the plurality of first peripheral components or the plurality of second peripheral components.

14. The method of claim 13, wherein the arbitrating the access requests further comprises:
synchronizing, via a handshake protocol, arbitration between a first arbitration component of the first on-chip bus and a second arbitration component of the second on-chip bus;
arbitrating access requests from the master agents of the first SoC via the first arbitration component of the first on-chip bus and disabling a second arbitration component of the second on-chip bus in response to the handshake protocol; and
combining access grants from the master agents of the first SoC and the second SoC.

15. The method of claim 12, further comprising:
extending an error correction code protection/error detection code protection via the transparent interface to include both a first on-chip bus protocol utilized by the first on-chip bus and a second on-chip bus protocol by the second on-chip bus.

16. The method of claim 11, further comprising:
operating the first core with one or more first computer processing units and the second core with one or more second computer processing units having different operating frequencies than the first computer processing units.

17. The method of claim 11, further comprising:
enabling, via the transparent interface, communication with a non-volatile memory of the plurality of first peripheral components at the first SoC from the second SoC comprising a smaller feature size than the first SoC that makes the second on-chip bus incompatible with any non-volatile memory on the second SoC.

18. An apparatus for a multiple chip architecture comprising:
a first system on-chip (SoC), comprising a first core and one or more first peripheral components on a substrate, configured to enable communication among the first core and the one or more first peripheral components via a first on-chip bus protocol of a first on-chip bus based on a first system map with a first plurality of addresses corresponding to the first core and the one or more first peripheral components; and
a transparent interface configured to enable communication between the first on-chip bus and a second on-chip bus of a second SoC when coupled to one another based on a consistent system address map comprising unique and non-overlapping addresses corresponding to the first core, the one or more peripheral components, a second core of the second SoC and one or more second peripheral components of the second SoC, wherein the second core and the one or more second peripheral components are configured to communicate among one another via the second on-chip bus based on a second system map.

19. The apparatus of claim 18, wherein the first on-chip bus system comprises a first arbitration component configured to control arbitration of access requests from a plurality of master agents of the first SoC while a second arbitration component of the second on-chip bus system is at least partially disabled, and combine access grants from the second arbitration component and the plurality of master agents of the first SoC to determine winning grants for access to a slave agent.

20. The apparatus of claim 18, wherein the first SoC and the second SoC are coupled together on a same substrate, and one of the first SoC or the second SoC comprises a physical connection pad while an other one of the first SoC or the second SoC is without any physical connection pad and configured to communicate with external components via the physical connection pad.

21. The apparatus of claim 18, wherein the transparent interface utilizes a single phase locked loop located at one of the first SoC or the second SoC to control a synchronization of communications of between the first SoC and the second SoC.

22. The apparatus of claim 18, wherein the transparent interface is configured to enable communication between the second on-chip bus system and a Flash memory of the one or more first peripheral components of the first SoC, wherein the first SoC, wherein the first SoC is configured according to a non-volatile memory compatible based technology with a larger feature size than a smaller feature size of the second SoC configured according to a non-volatile memory incompatible based technology, wherein the larger feature size enables the communication with a Flash memory of the one or more first peripheral components.

23. The apparatus of claim 18, wherein the first on-chip bus system and the second on-chip bus system comprise one or more access protection components configured to assign one or more unique tag identifiers (IDs) to one or more master, wherein the one or more unique tag IDs enable slave agents to identify the corresponding master agents and further enable transparent access via the transparent interface to the one or more first on-chip peripheral components or the one or more second on-chip peripheral components based on the one or more unique tag IDs.

24. The apparatus of claim 18, wherein the first on-chip bus system comprises a first interrupt component configured to arbitrate among interrupts mapped to the second SoC, and route winning interrupt signals to a second interrupt component of the second on-chip bus system via the transparent interface.

25. The apparatus of claim 24, wherein the first SoC is further configured to signal one or more interrupt triggers to an interrupt service provider on the second SoC via one or more dedicated interrupt trigger connections.

* * * * *